(12) United States Patent
Miura et al.

(10) Patent No.: US 11,904,583 B2
(45) Date of Patent: Feb. 20, 2024

(54) VEHICLE CONSTITUENT MEMBER AND MANUFACTURING METHOD THEREOF

(71) Applicant: Toyota Jidosha Kabushiki Kaisha, Toyota (JP)

(72) Inventors: Masaya Miura, Toyota (JP); Tsuyoshi Izuhara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 16/508,732

(22) Filed: Jul. 11, 2019

(65) Prior Publication Data
US 2020/0031087 A1 Jan. 30, 2020

(30) Foreign Application Priority Data
Jul. 30, 2018 (JP) ................. 2018-142670

(51) Int. Cl.
| | | |
|---|---|---|
| B32B 7/12 | (2006.01) | |
| B62D 25/02 | (2006.01) | |
| B32B 3/12 | (2006.01) | |
| B62D 21/15 | (2006.01) | |
| B62D 29/00 | (2006.01) | |
| B60J 5/04 | (2006.01) | |

(Continued)

(52) U.S. Cl.
CPC ............ *B32B 3/12* (2013.01); *B32B 7/12* (2013.01); *B32B 15/08* (2013.01); *B32B 15/20* (2013.01);
(Continued)

(58) Field of Classification Search
None
See application file for complete search history.

(56) References Cited

U.S. PATENT DOCUMENTS 6,468,613 B1 * 10/2002 Kitano .................. B32B 33/00
428/35.8
2016/0083021 A1 * 3/2016 Kosaka ................ B62D 25/02
296/191

(Continued)

FOREIGN PATENT DOCUMENTS

| CN | 106182757 A | 12/2016 |
|---|---|---|
| JP | 01-106217 U | 7/1989 |

(Continued)

OTHER PUBLICATIONS

Nishida et al., machine translation of JP 2006-213312 Abstract and Description, Aug. 17, 2006 (Year: 2006).*

(Continued)

*Primary Examiner* — Mary I Omori
(74) *Attorney, Agent, or Firm* — Dinsmore & Shohl LLP

(57) ABSTRACT

A vehicle constituent member and a manufacturing method for manufacturing the vehicle constituent member are provided. The vehicle constituent member includes: a body portion made of metal and having a vertical wall; a reinforcing member made of fiber reinforced resin and having a sheet shape, the reinforcing member being disposed on a surface of the vertical wall; and an adhesive layer provided between the surface of the vertical wall and the reinforcing member and connecting the vertical wall and the reinforcing member, the adhesive layer being configured such that a thickness of a part of the adhesive layer becomes thinner as the part of the adhesive layer is distanced outwardly from a surface end of the reinforcing member, the part of the adhesive layer being disposed outwardly from the surface end of the reinforcing member.

6 Claims, 12 Drawing Sheets

(51) Int. Cl.
  *B62D 25/04* (2006.01)
  *B32B 15/08* (2006.01)
  *B32B 15/20* (2006.01)
  *B32B 37/10* (2006.01)
  *B60R 19/18* (2006.01)

(52) U.S. Cl.
  CPC ......... *B32B 37/1018* (2013.01); *B60J 5/0444* (2013.01); *B60J 5/0461* (2013.01); *B60R 19/18* (2013.01); *B62D 21/157* (2013.01); *B62D 25/04* (2013.01); *B62D 29/008* (2013.01); *B32B 2262/106* (2013.01); *B32B 2605/08* (2013.01); *B60R 2019/1806* (2013.01)

(56) References Cited

U.S. PATENT DOCUMENTS

| | | | |
|---|---|---|---|
| 2016/0347377 A1* | 12/2016 | Minei | B29C 65/56 |
| 2018/0162302 A1* | 6/2018 | Kitakata | B60R 19/18 |
| 2018/0257586 A1* | 9/2018 | Kitakata | B60R 19/03 |

FOREIGN PATENT DOCUMENTS

| | | | |
|---|---|---|---|
| JP | 1106217 U | * | 7/1989 |
| JP | 2003-129611 A | | 5/2003 |
| JP | 2006213312 A | * | 8/2006 |
| JP | 2008-143936 A | | 6/2008 |
| JP | 2011144256 A | * | 7/2011 |
| JP | 2013-184630 A | | 9/2013 |
| JP | 2015160524 A | * | 9/2015 |
| JP | 2018-030542 A | | 3/2018 |

OTHER PUBLICATIONS

Kato Seiya, machine translation of JP 2011-144256 Abstract and Description, Jul. 28, 2011 (Year: 2011).*
Egami, Yuuichi, translation of JPH 01-106217, Jul. 18, 1989 (Year: 1989).*

* cited by examiner

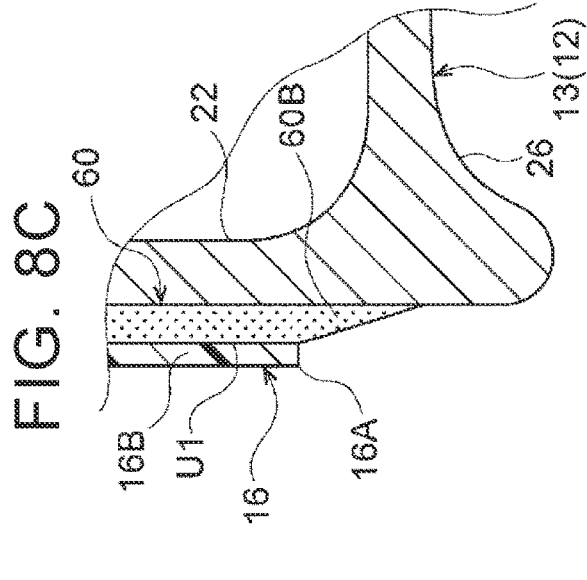
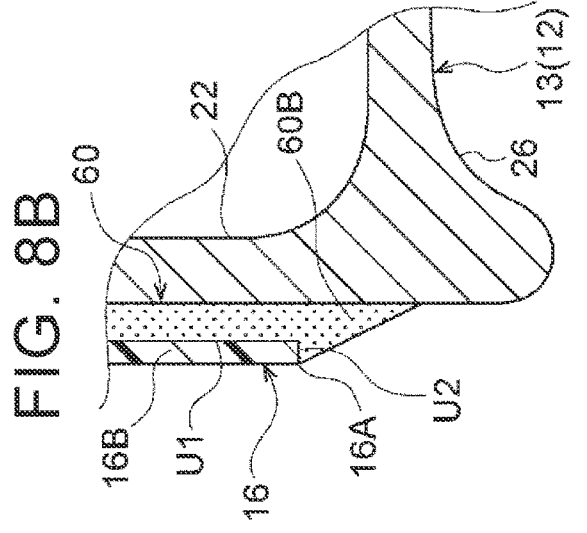
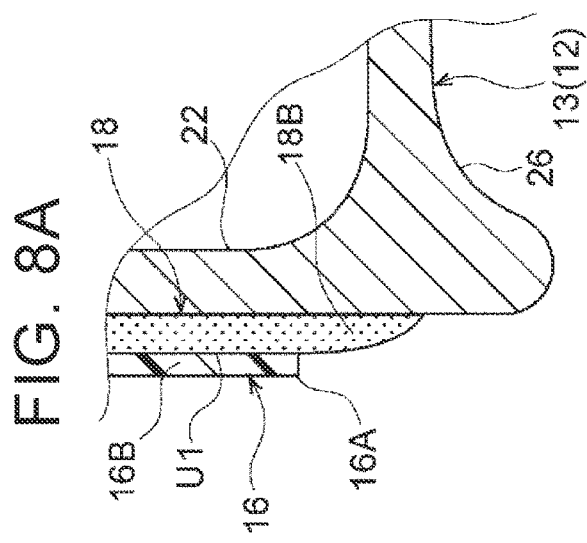
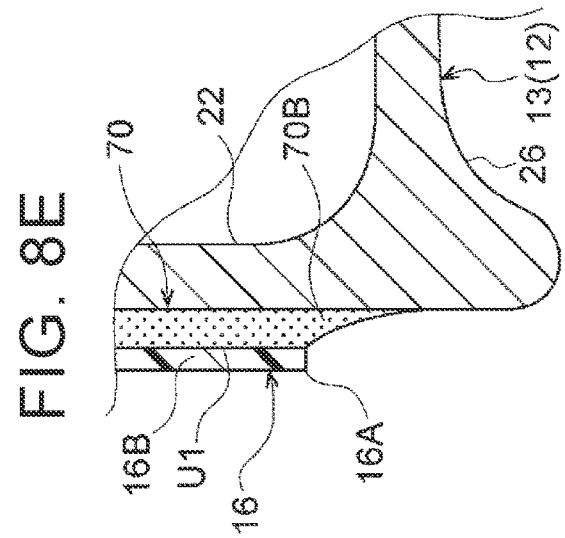
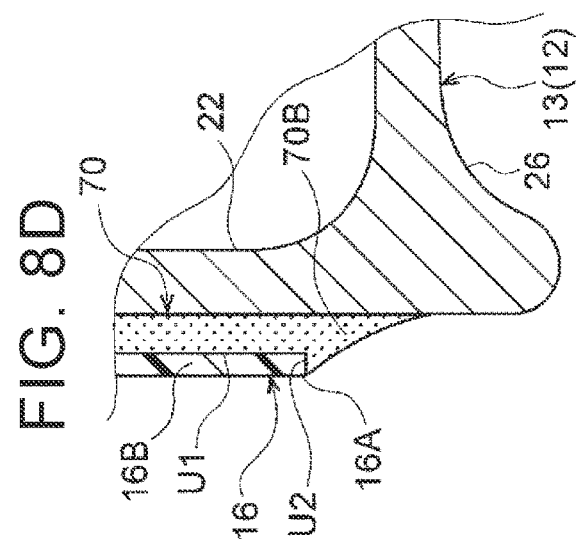

VEHICLE CONSTITUENT MEMBER AND MANUFACTURING METHOD THEREOF

CROSS-REFERENCE TO RELATED APPLICATIONS

This application claims priority to Japanese Patent Application No. 2018-142670 filed on Jul. 30, 2018, which is incorporated herein by reference in its entirety including the specification, drawings and abstract.

BACKGROUND

1. Technical Field

The disclosure relates to a vehicle constituent member and a manufacturing method thereof.

2. Description of Related Art

In recent years, there is a technology that a composite such as fiber reinforced resin (FRP) is attached to a metal vehicle constituent member so as to improve the strength of the vehicle constituent member.

Japanese Unexamined Patent Application Publication No. 2018-030542 (JP 2018-030542 A) discloses a structure in which a reinforcing plate formed by use of fiber reinforced resin (CFRP or GFRP) is joined to a metal bumper reinforcement. In this related art, the reinforcing plate having a rectangular plate shape (or a sheet shape) with its longitudinal direction being along the vehicle width direction is fixed to an inner face of the bumper reinforcement via an adhesive. Hereby, the bumper reinforcement is reinforced by the reinforcing plate.

SUMMARY

In the meantime, in a joining structure between the metal vehicle constituent member and a fiber reinforced resin material as described above, in a case where separation of the vehicle constituent member from the fiber reinforced resin material occurs, this separation may be caused due to separation of the adhesive from the vehicle constituent member.

In the bumper reinforcement, when an external force is applied due to a collision of a vehicle or the like and a stress excessively concentrates on a surface end of the reinforcing plate, an adhesive that joins the surface end might be peeled off from the bumper reinforcement. On this account, the restraint of the stress concentration on the adhesive in the vicinity of the surface end of the reinforcing plate leads to improvement in the joining strength between the bumper reinforcement and the reinforcing plate.

The disclosure relates to a structure in which a reinforcing member made of fiber reinforced resin and formed into a sheet shape is joined to a metal vehicle constituent member, and the disclosure provides a vehicle constituent member that can achieve improvement of joining strength between the vehicle constituent member and a reinforcing member, and a manufacturing method thereof.

A first aspect of the disclosure provides a vehicle constituent member including: a body portion made of metal and having a pair of vertical walls disposed such that the vertical walls face each other; a reinforcing member made of fiber reinforced resin and having a sheet shape, the reinforcing member being disposed on a first surface of one of the vertical walls, the first surface being on a side opposite from a second surface of the one of the vertical walls, the second surface facing the other one of the vertical walls; and an adhesive layer provided between the one of the vertical walls and the reinforcing member and joining the one of the vertical walls to the reinforcing member, the adhesive layer being configured such that a thickness, in a vehicle front-rear direction, of a part of the adhesive layer becomes thinner as the part of the adhesive layer is distanced outwardly from a surface end of the reinforcing member, the part of the adhesive layer being disposed outwardly from the surface end of the reinforcing member.

In the first aspect, the body portion has the vertical walls disposed to face each other. The sheet-shaped reinforcing member made of fiber reinforced resin is joined, via the adhesive layer, to the first surface of the one of the vertical walls, the first surface being on the side opposite from the second surface facing the other one of the vertical walls. Hereby, the vehicle constituent member is reinforced by the reinforcing member.

Here, in the first aspect, the adhesive layer is formed such that the thickness, in the vehicle front-rear direction, of the part disposed outwardly from the surface end of the reinforcing member becomes thinner as the part is distanced outwardly from the surface end. Hereby, at the time when an external force input into the vehicle constituent member due to a collision of the vehicle or the like is transmitted to the adhesive layer, a stress is restrained from concentrating on the adhesive layer disposed in the vicinity of the surface end of the reinforcing member. As a result, separation of the surface end of the adhesive layer from the body portion is restrained, thereby making it possible to improve the joining strength between the vehicle constituent member and the reinforcing member.

The vehicle constituent member according to the first aspect has an excellent effect that, in a structure in which a reinforcing member made of fiber reinforced resin and formed into a sheet shape is joined to a metal vehicle constituent member, it is possible to improve the joining strength between the vehicle constituent member and the reinforcing member.

In the first aspect, an end surface of the reinforcing member may be covered with the adhesive layer.

In the vehicle constituent member, the end surface of the reinforcing member is covered with the adhesive layer. On this account, the adhesive layer has a joining surface along a direction (a surface direction) where the surface of the reinforcing member expands and a joining surface along the thickness direction. Hereby, for example, in comparison with a case where the reinforcing member is joined to the adhesive layer only by the joining surface along the surface direction of the reinforcing member, a contact area between the reinforcing member and the adhesive layer that is, a joining area between the reinforcing member and the adhesive layer increases. As a result, the joining strength between the reinforcing member and the adhesive layer improves, so that the joining strength between the vehicle constituent member and the reinforcing member eventually improves.

The vehicle constituent member according to the above configuration has an excellent effect that the joining strength between the reinforcing member and the adhesive layer improves, so that the joining strength between the vehicle constituent member and the reinforcing member eventually improves.

In the first aspect, a first portion of the adhesive layer, the first portion being disposed outwardly from the surface end of the reinforcing member, may have a quadrant shape in a sectional view of the body portion along the vehicle front-rear direction.

In the vehicle constituent member, similarly to the first aspect, the adhesive layer is formed such that the thickness, in the vehicle front-rear direction, of the part disposed outwardly from the surface end of the reinforcing member becomes thinner as the part is distanced outwardly from the surface end. Hereby, at the time when an external force is applied to the adhesive layer of the vehicle constituent member due to a collision of the vehicle or the like, a stress is restrained from concentrating on the adhesive layer disposed in the vicinity of the surface end of the reinforcing member. That is, the joining strength between the vehicle constituent member and the adhesive layer improves.

Further, the part of the adhesive layer, the part being disposed outwardly in the surface direction from the surface end of the reinforcing member, has a quadrant shape in a sectional view along the vehicle front-rear direction. This makes it easy to secure the thickness of the adhesive layer disposed in the vicinity of the surface end of the reinforcing member. This makes it possible to maintain the joining strength between the reinforcing member and the adhesive layer. Hereby, in the adhesive layer having the above configuration, it is possible to effectively achieve improvement of the joining strength between the vehicle constituent member and the reinforcing member.

The vehicle constituent member according to the above configuration has an excellent effect that the improvement of the joining strength between the vehicle constituent member and the reinforcing member is more effectively achieved by the adhesive layer.

A second aspect of the disclosure provides a manufacturing method for manufacturing the vehicle constituent member. The manufacturing method includes: providing the adhesive layer on the one of the vertical walls of the body portion; laminating the fiber reinforced resin formed into a sheet shape on the adhesive layer so as to form the reinforcing member; covering the one of the vertical walls of the body portion with a covering member from a top of the laminated fiber reinforced resin and performing vacuum drawing on an internal space formed between the one of the vertical walls and the covering member; and performing a heat treatment on the one of the vertical walls in a state where the one of the vertical walls is covered with the covering member, so as to perform respective heat curing processes of the fiber reinforced resin and the adhesive layer at the same time.

The manufacturing method of the second aspect includes laminating the adhesive layer and the sheet-shaped fiber reinforced resin on the one of the vertical walls of the metal body portion in advance. Then, the one of the vertical walls of the body portion is covered with the covering member, and vacuum drawing is performed on the internal space formed between the one of the vertical walls of the body portion and the covering member. After that, the heat treatment is performed on the one of the vertical walls of the body portion, so as to perform respective heat curing processes of the reinforcing member and the adhesive layer in the vehicle constituent member at the same time.

Here, in the vacuum drawing, the covering member deforms to stick to the one of the vertical walls of the body portion. Along with this, the adhesive layer and the reinforcing member (the sheet-shaped fiber reinforced resin) laminated on the one of the vertical walls of the body portion are pressed by the covering member. As a result, the adhesive layer deforms such that the thickness, in the vehicle front-rear direction, of a part disposed outwardly in the surface direction from the surface end of the reinforcing member becomes thinner as the part is distanced outwardly from the surface end. Hereby, similarly to the first aspect, it is possible to manufacture the vehicle constituent member that can achieve improvement of the joining strength between the vehicle constituent member and the reinforcing member.

The manufacturing method according to the second aspect has an excellent effect that, in a vehicle constituent member in which a reinforcing member made of fiber reinforced resin and formed into a sheet shape is joined to a metal vehicle constituent member, it is possible to manufacture a vehicle constituent member that can achieve improvement of the joining strength between the vehicle constituent member and the reinforcing member.

A third aspect provides a vehicle constituent member including: a body portion made of metal and having a vertical wall extending in a vehicle up-down direction; a reinforcing member made of fiber reinforced resin and having a sheet shape, the reinforcing member being disposed on a surface of the vertical wall; and an adhesive layer provided between the surface of the vertical wall and the reinforcing member and connecting the vertical wall and the reinforcing member, the adhesive layer being configured such that a thickness of a part of the adhesive layer becomes thinner as the part of the adhesive layer is distanced outwardly from a surface end of the reinforcing member in a planar view of the reinforcing member, the part of the adhesive layer being disposed outwardly from the surface end of the reinforcing member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein;

FIG. 8A is a sectional view corresponding to FIG. 2 and illustrates a first modification of an adhesive layer of the first embodiment;

FIG. 8B is a sectional view corresponding to FIG. 2 and illustrates a modification of the adhesive layer of the first embodiment;

FIG. 8C is a sectional view corresponding to FIG. 2 and illustrates a modification of the adhesive layer of the first embodiment;

FIG. 8D is a sectional view corresponding to FIG. 2 and illustrates a modification of the adhesive layer of the first embodiment;

FIG. 8E is a sectional view corresponding to FIG. 2 and illustrates a modification of the adhesive layer of the first embodiment;

DETAILED DESCRIPTION OF EMBODIMENTS

The following describes a bumper RF 12 as a vehicle constituent member according to a first embodiment of the disclosure and a manufacturing method thereof with reference to FIGS. 1 to 8E. Note that an arrow FR shown appropriately in each figure indicates the front side in the vehicle front-rear direction, an arrow UP indicates the upper side in the vehicle up-down direction, and an arrow OUT indicates the outer side in a vehicle width direction. Hereinafter, in a case where a description is made by use of merely directions of front and rear, directions of up and down, and directions of right and left without any special mention, they indicate the front and rear sides in the vehicle front-rear direction, the up and down sides in the vehicle up-down direction, and the right and left of a vehicle facing toward its traveling direction.

Figure 3:
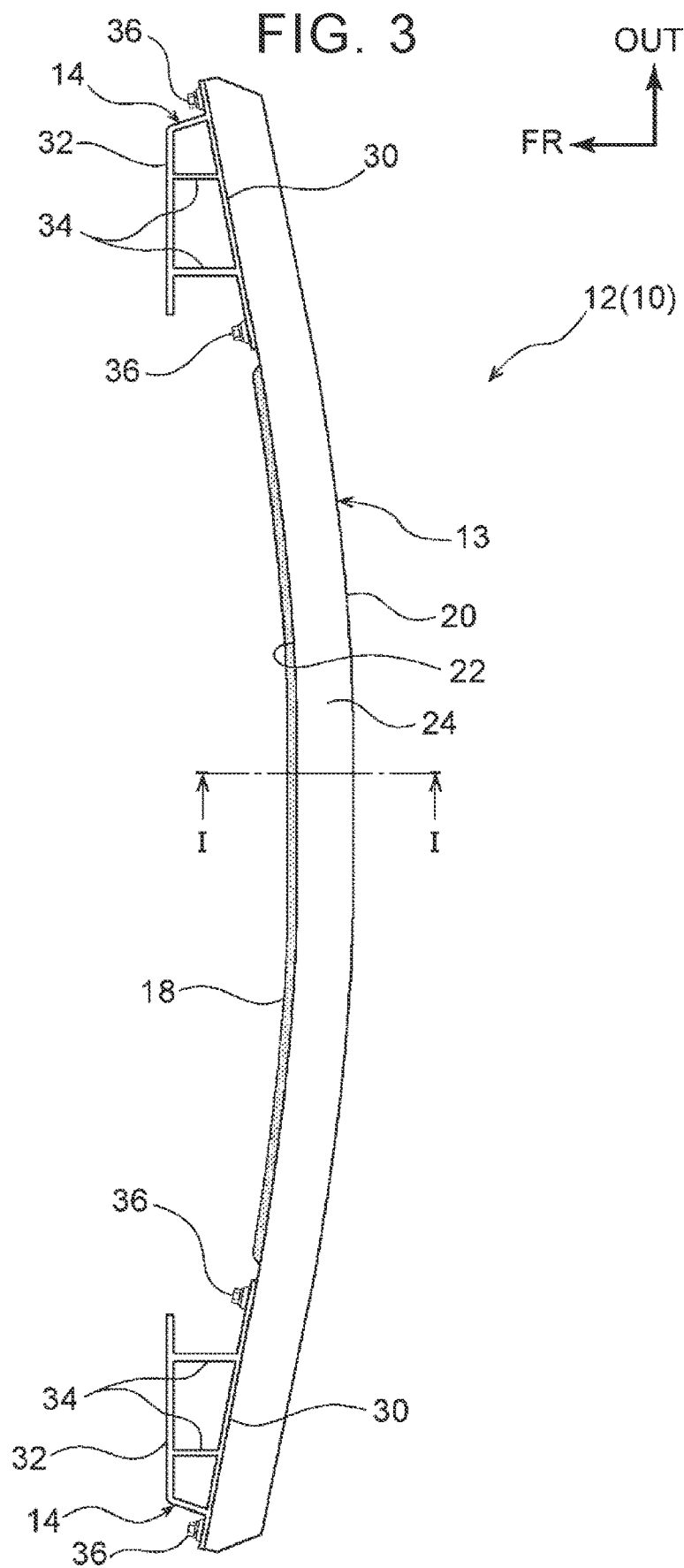
FIG. 3 is a plan view illustrating a bumper reinforcement according to the first embodiment.
Figure 4:
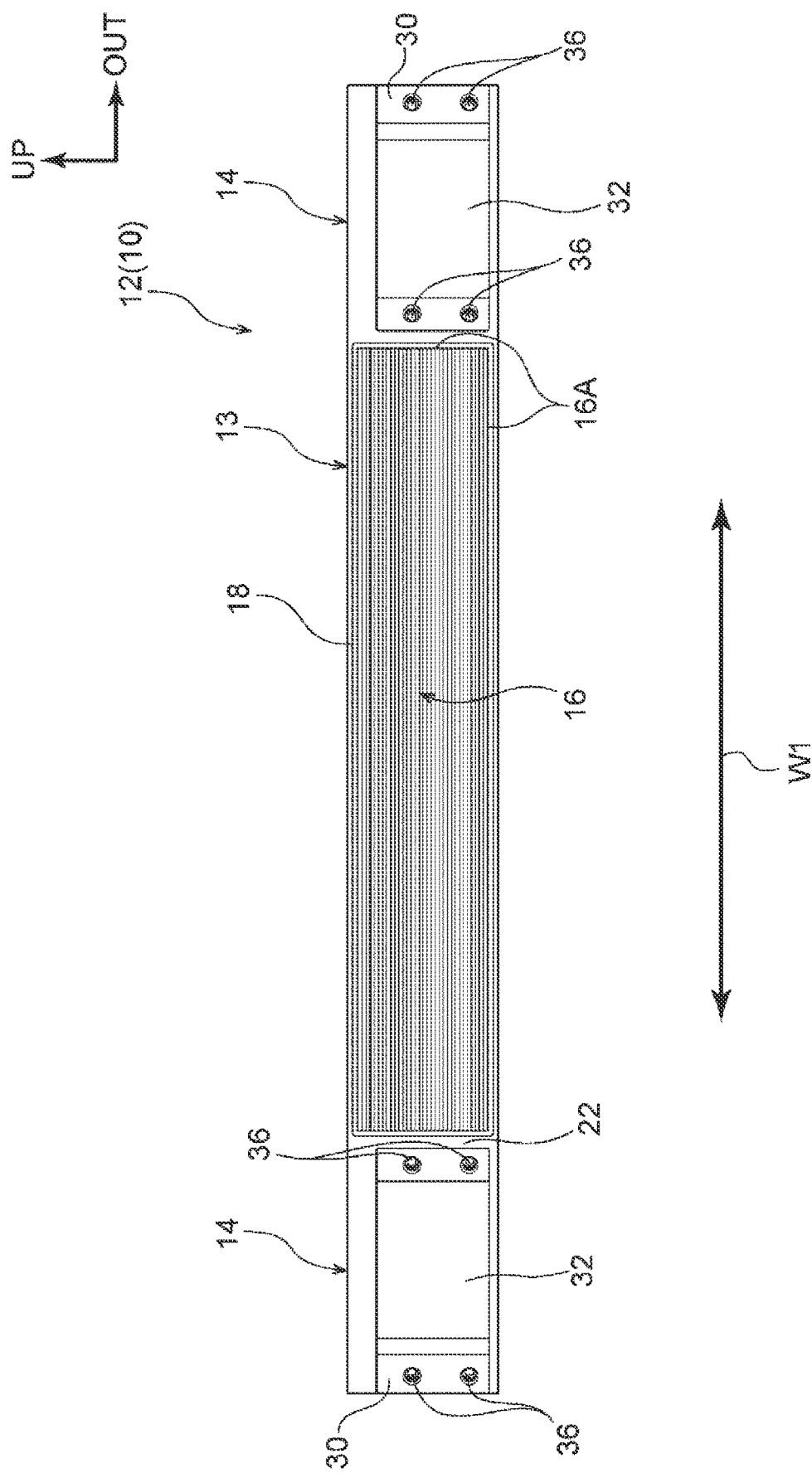
FIG. 4 is a rear view of the bumper reinforcement illustrated in FIG. 3 when the bumper reinforcement is viewed from the front side in the vehicle front-rear direction.

FIG. 3 is a plan view of a part of a vehicle bumper 10 to which the bumper RF 12 according to the present embodiment is applied, when it is viewed from the upper side in the vehicle up-down direction, and FIG. 4 is a rear view of the part of the vehicle bumper 10 when it is viewed from the front side in the vehicle front-rear direction.

As illustrated in those figures, the vehicle bumper 10 (hereinafter also just referred to as the "bumper 10") is disposed in a rear end of a vehicle. The bumper 10 is constituted by a metal bumper reinforcement 12 disposed with its longitudinal direction being along the vehicle width direction, and a pair of crush boxes 14. The crash boxes 14 are provided in the opposite ends of the bumper reinforcement 12 in the vehicle width direction. Further, the bumper reinforcement 12 is constituted by a reinforcing member 16 joined to an inner face of the bumper reinforcement 12 in the vehicle front-rear direction via an adhesive layer 18. Note that, in the following description, the "bumper reinforcement 12" is also referred to as the "bumper RF 12." Further, the bumper reinforcement 12 corresponds to a "vehicle constituent member" in the disclosure.

The bumper RF 12 is disposed on the front side, in the vehicle front-rear direction (on the inner side, in the vehicle front-rear direction), of a bumper cover (not shown) disposed in the rear end of the vehicle. The bumper RF 12 is formed in a generally rectangular hollow columnar shape and is disposed with its longitudinal direction being along the vehicle width direction. Further, the bumper RF 12 is softly curved forward when it goes outward in the vehicle width direction from the central part of the bumper RF 12 in the vehicle width direction in a plan view.

Figure 1:
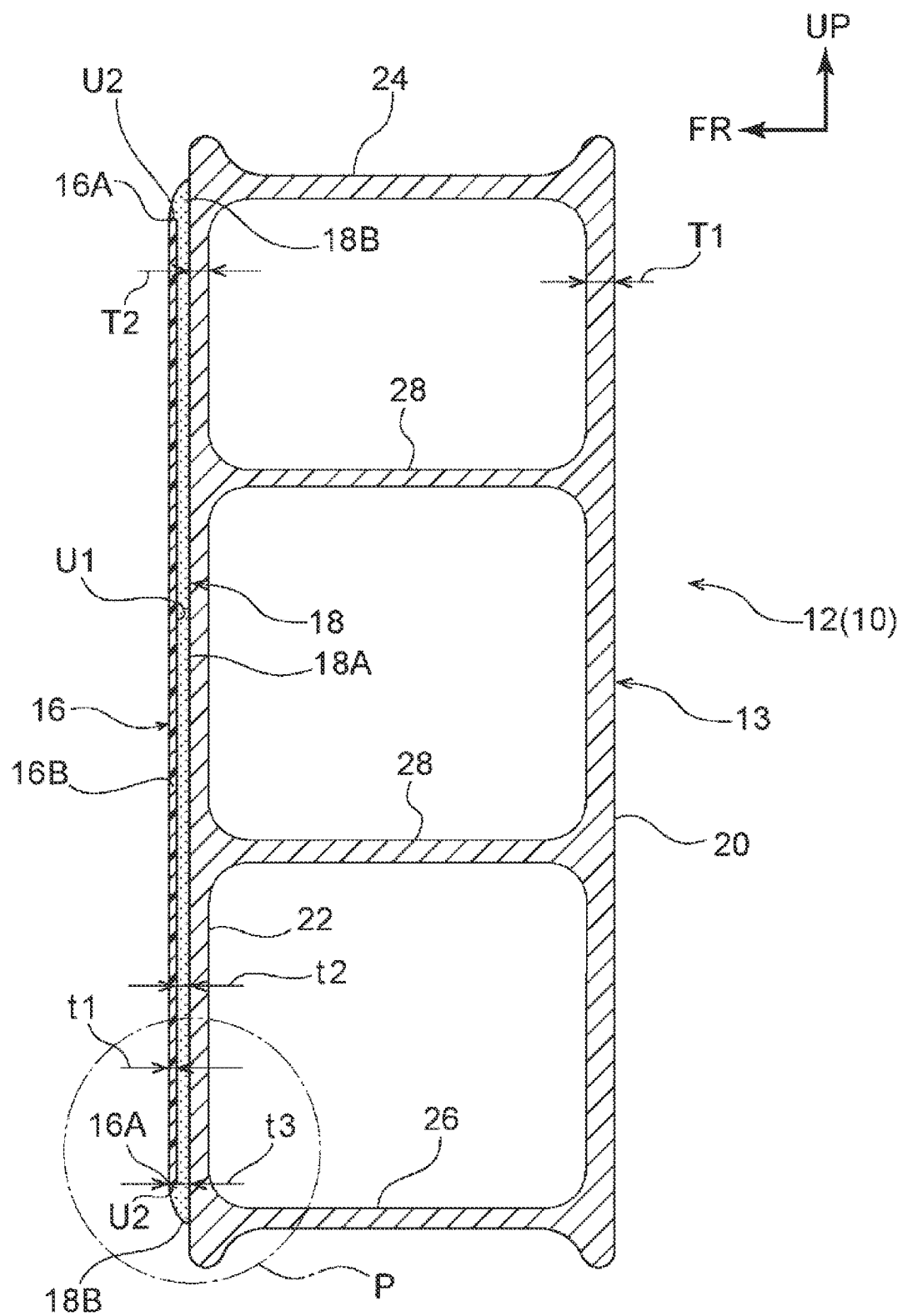
FIG. 1 is an enlarged sectional view illustrating a state where a bumper reinforcement according to a first embodiment is cut along a line 1-1 in FIG. 3.

As illustrated in FIG. 1, the bumper RF 12 includes a metal body portion 13, a sheet-shaped reinforcing member 16, and an adhesive layer 18 joining the body portion 13 to the reinforcing member 16. The body portion 13 is formed to have a generally ladder-shaped section when the body portion 13 is viewed from the longitudinal direction of the bumper RF 12. More specifically, the body portion 13 includes a first vertical wall 20 having a thickness direction along the vehicle front-rear direction and extending in the vehicle up-down direction so as to constitute a rear face of the bumper RF 12 in the vehicle front-rear direction (an outer face of the bumper RF 12 in the vehicle trout-rear direction). Further, the body portion 13 includes a second vertical wall 22 extending generally in parallel with the first vertical wall 20, having a thickness direction along the vehicle front-rear direction, and extending in the vehicle up-down direction so as to constitute a front face of the bumper RF 12 in the vehicle front-rear direction (an inner face of the bumper RF 12 in the vehicle front-rear direction). Further, the body portion 13 includes an upper wall 24 having a thickness direction along the vehicle up-down direction and connecting an upper end of the first vertical wall 20 to an upper end of the second vertical wall 22 in the vehicle front-rear direction, and a lower wall 26 connecting a lower end of the first vertical wall 20 to a lower end of the second vertical wall 22 in the vehicle front-rear direction. Further, a plurality of (two, in the present embodiment) reinforcing walls 28 is provided between the upper wall 24 and the lower wall 26 such that the reinforcing walls 28 are disposed at a predetermined interval along the vehicle up-down direction. The reinforcing walls 28 are disposed with a thickness direction being along the vehicle up-down direction so as to connect the first vertical wall 20 to the second vertical wall 22 in the vehicle front-rear direction. Hereby, the sectional structure of the body portion 13 is a sectional structure in which a plurality of (three, in the present embodiment) closed sections having a generally rectangular shape is arranged in the up-down direction. Note that the first vertical wall 20 and the second vertical wall 22 correspond to "a pair of vertical walls" in the disclosure.

Further, as illustrated in FIG. 1, a thickness T1 of the first vertical wall 20 is set to be thicker than a thickness T2 of the second vertical wall 22.

In the present embodiment, the body portion 13 is made of aluminum alloy and manufactured by a technique such as extrusion molding. However, the body portion 13 may be made of steel, iron, or the like, provided that the body portion 13 is made of metal.

As illustrated in FIGS. 3 and 4, a pair of right and left crash boxes 14 is provided such that the right and left crash boxes 14 are connected to the opposite ends of the body portion 13 in the vehicle width direction. The crash box 14 includes a rear vertical wall 30 put on a front face of the body portion 13 in the vehicle front-rear direction. The rear vertical wall 30 is constituted as a generally rectangular plate when the rear vertical wall 30 is viewed from the vehicle front-rear direction, and the rear vertical wall 30 is fastened and fixed to the front face of the body portion 13 in the vehicle front-rear direction by use of a fastener 36.

Further, the crash box 14 includes a front vertical wall 32 provided in front of the rear vertical wall 30 in the vehicle front-rear direction so as to face the rear vertical wall 30. The rear vertical wall 30 is connected to the front vertical wall 32 via a plurality of (two, in the present embodiment) lateral walls 34 extending along the vehicle front-rear direction. A pair of right and left rear side members (not shown) is provided so as to constitute a part of a vehicle body, and respective from ends of the crash boxes 14 in the vehicle front-rear direction are connected to the right and left rear side members. Hereby, the bumper RF 12 is supported by the rear side members via the crash boxes 14.

As illustrated in FIG. 4, a reinforcing member 16 provided between the crash boxes 14 is joined to the front face of the body portion 13 in the vehicle front-rear direction. The reinforcing member 16 is made of fiber reinforced resin (CFRP or GFRP), and the reinforcing member 16 is formed in a rectangular plate shape extending with its thickness direction being along the vehicle front-rear direction and its longitudinal direction being along the vehicle width direction. Further, in the present embodiment, the direction of fibers (carbon fibers or glass fibers) in the reinforcing member 16 agrees with the longitudinal direction of the reinforcing member 16 (see an arrow-W1 direction in FIG. 4).

As will be described later, as the reinforcing member 16, a carbon fiber reinforced resin plate formed in such a manner that a plurality of prepreg materials 40 (formed by mixing carbon fiber in a matrix resin) is laminated such that their fiber directions agree with each other is used. Note that, in the present embodiment, the reinforcing member 16 is formed by laminating six prepreg materials 40.

Figure 2:
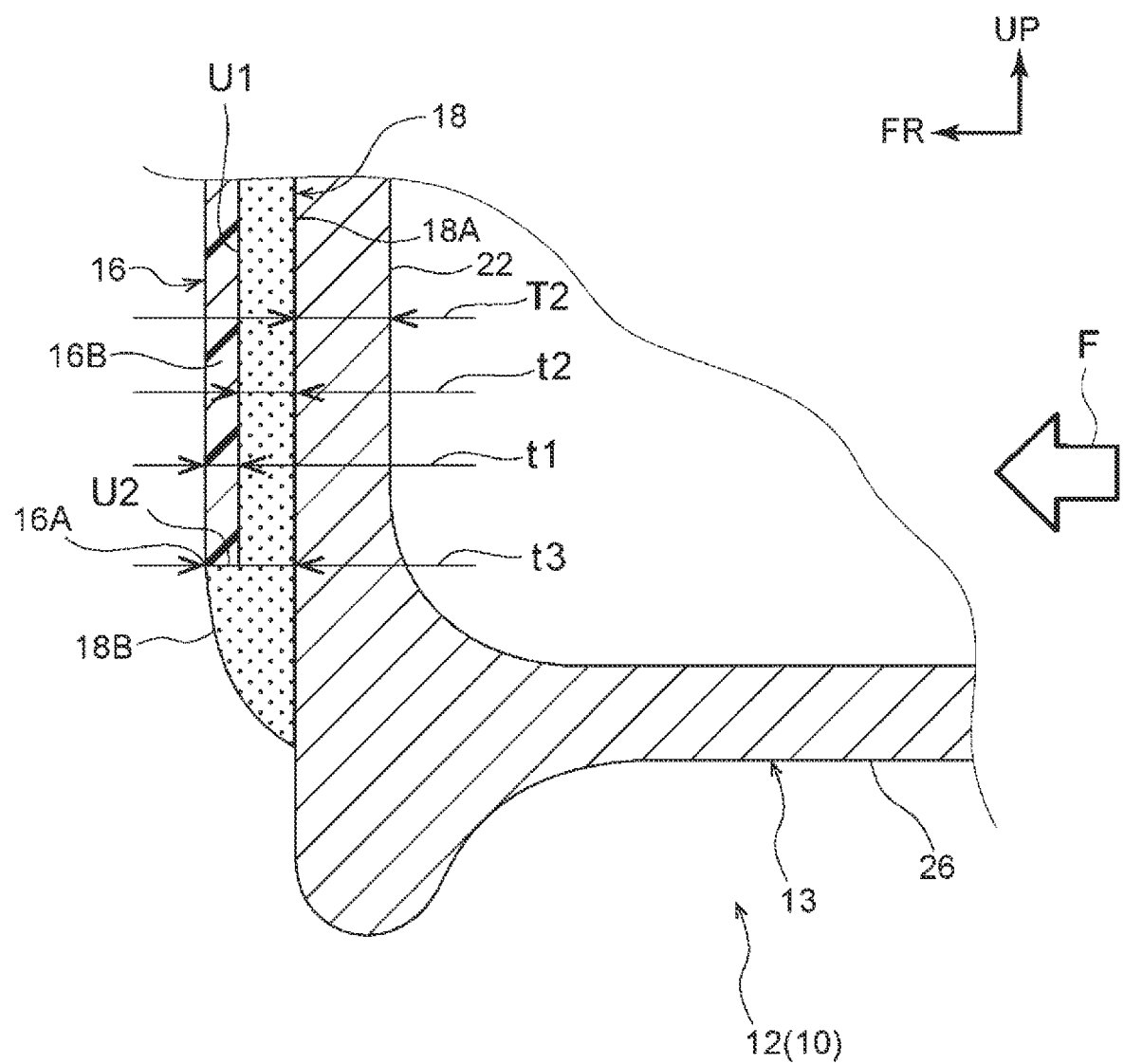
FIG. 2 is an enlarged sectional view that enlarges a region P indicated by an alternate long and short dash line in FIG. 1.

As illustrated in FIGS. 1 and 2, the reinforcing member 16 is joined to a front face of the bumper RF 12 in the vehicle front-rear direction via the adhesive layer 18. The adhesive layer 18 has a longitudinal direction along the vehicle width direction and is formed in a rectangular sheet shape that is one size larger than the outer shape of the reinforcing member 16, when the adhesive layer 18 is viewed from the vehicle front-rear direction. That is, the adhesive layer 18 includes a part (a basic layer 18A) placed over between the bumper RF 12 mid the reinforcing member 16, and a part (an end layer 18B) placed outwardly in a surface direction from a surface end 16A of the reinforcing member 16. Note that, in the present embodiment, the surface direction may be considered to be a direction along the surface of the reinforcing member 16. Further, the part placed outwardly in the surface direction from the surface end 16A may be considered to be an outer part of the reinforcing member 16 (that is, the periphery of the reinforcing member 16) in a plan view of the reinforcing member 16.

Note that FIG. 2 illustrates a sectional view of the lower end of the reinforcing member 16 in the vehicle up-down direction when the lower end of the reinforcing member 16 in the vehicle up-down direction is cut along the vehicle front-rear direction. The sectional shapes of the upper end of the reinforcing member 16 in the vehicle up-down direction and the opposite ends of the reinforcing member 16 in the vehicle width direction when they are cut along the vehicle front-rear direction are the same shape as that in FIG. 2, so they are not illustrated herein.

As illustrated in FIGS. 1 and 2, the reinforcing member 16 is joined in a slate where the reinforcing member 16 is slightly buried in the adhesive layer 18, and no step is formed in a boundary portion between the surface end 16A of the reinforcing member 16 and the adhesive layer 18. That is, an end surface 16B of the reinforcing member 16 is covered with the adhesive layer 18, and the reinforcing member 16 and the adhesive layer 18 have a joining surface U1 along the surface direction of the reinforcing member 16 and a joining surface U2 along the thickness direction of the reinforcing member 16.

Further, the basic layer 18A of the adhesive layer 18 is set to have a generally uniform thickness in the vehicle front-rear direction and extends in a flat-plate shape. In the meantime, the end layer 18B has a quadrant sectional shape along the vehicle front-rear direction, and the end layer 18B is formed such that its thickness in the vehicle front-rear direction is gradually reduced as it goes outwardly in the surface direction (that is, as the end layer 18B is distanced outwardly from the surface end 16A of the reinforcing member 16).

Further, in the present embodiment, a plate thickness t2 of the basic layer 18A in the vehicle front-rear direction is larger than a plate thickness t1 of the reinforcing member 16 in the vehicle front-rear direction and is set to a thickness smaller than a maximum plate thickness t3 of the end layer 18B in the vehicle front-rear direction. In some embodiments, the plate thickness t2 of the basic layer 18A in the vehicle front-rear direction may be set to 1 mm or more.

In some embodiments, a thermosetting resin having an insulating property, such as epoxy-based resin or urethane-based resin, may be used for the adhesive layer 18. In the present embodiment, epoxy-based resin formed into a sheet shape is used for the adhesive layer 18. Note that, the adhesive constituting the adhesive layer 18 is not limited to a sheet shape and may be formed in a liquid form (a paste form).

Next will be described a manufacturing method of the bumper RF 12 of the present embodiment.

First, a billet (not shown) made of aluminum alloy and preheated in advance is inserted into a tubular container (not shown). A predetermined mold (not shown) is disposed inside the container, and the billet made of aluminum alloy is extruded by a pressing machine (not shown). Hereby, the body portion 13 of the bumper RF 12, formed as a hollow tubular body having a ladder-shaped section, is molded.

Subsequently, the body portion 13 is put on a predetermined working table such that the second vertical wall 22 faces up. Then, the sheet-shaped adhesive layer 18 is laminated on the second vertical wall 22 of the body portion 13 (a first step). Note that the laminating of the adhesive layer in the first step may be electrodeposition coating. Further, in the first step, before the adhesive layer 18 is disposed, the body portion 13 may be subjected to a degreasing process. Alternatively, a surface-roughening process (e.g., plasma polymerization or the like) may be performed on a whole rear face of the adhesive layer 18 in the vehicle front-rear direction. By performing such a process or the like, a joining area between the body portion 13 and the adhesive layer 18 increases, so that the joining strength can be increased.

Figure 5:
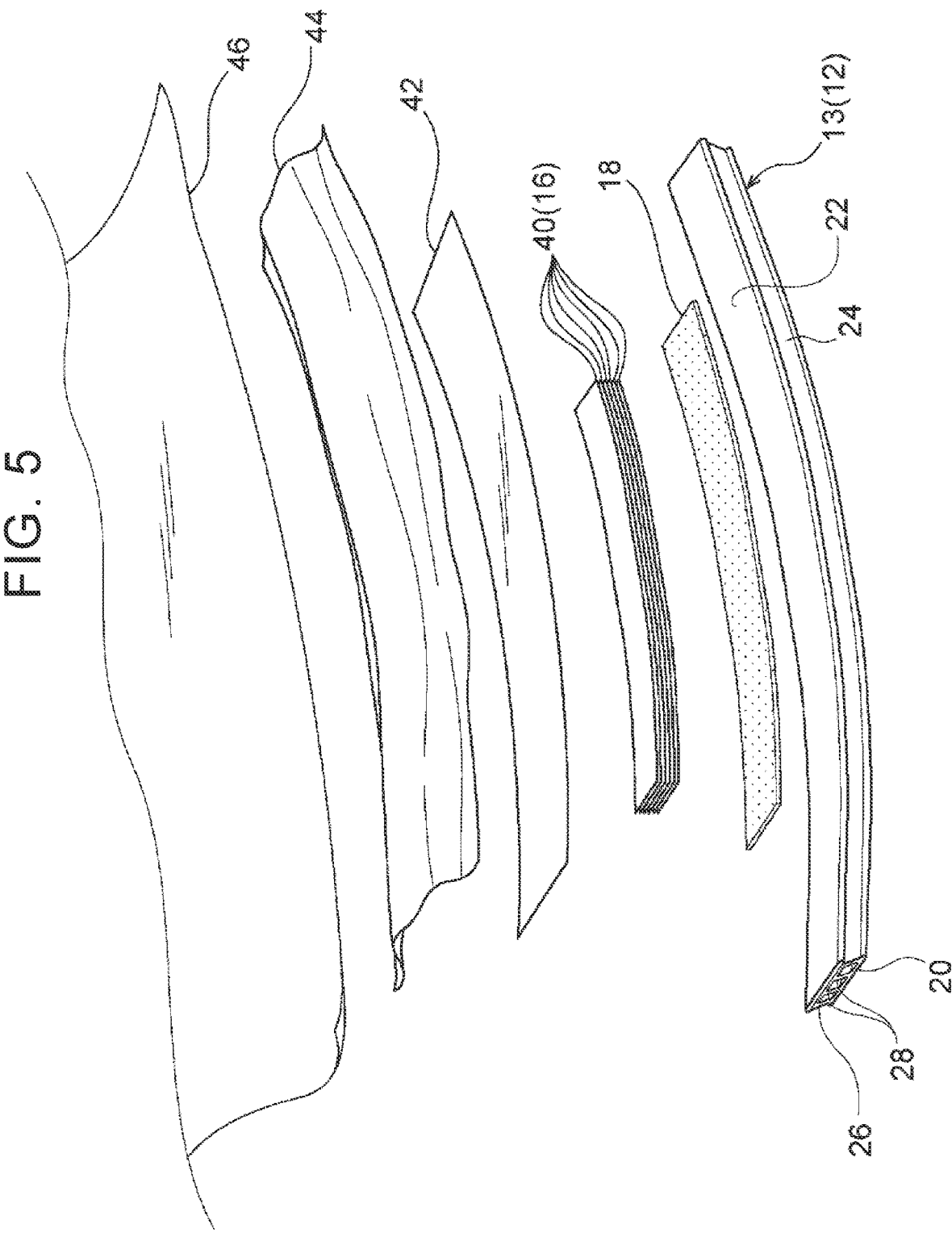
FIG. 5 is a schematic perspective view to describe a manufacturing method of the bumper reinforcement according to the first embodiment.

Subsequently, as illustrated in FIG. 5, six prepreg materials 40 are laminated on the adhesive layer 18 (a second step). At this time, respective fiber directions of the prepreg materials 40 agree with each other in a direction along the longitudinal direction of the body portion 13 (the vehicle width direction). Then, a mold releasing film 42 made of resin is put on the prepreg materials 40, so as to cover whole surfaces of the adhesive layer 18 and the prepreg materials. In some embodiments, the mold releasing film 42 may be a fluororesin film having heat resistance and having a nonadherent property.

Further, the breather cloth 44 made of non-woven fabric is put on the mold releasing film 42 from the top. It is necessary that the breather cloth 44 be disposed such that at least the whole mold releasing film 42 disposed on the second vertical wall 22 side of the body portion 13 is covered with the breather cloth 44. In the present embodiment, the breather cloth 44 is formed into a rectangular sheet shape and disposed to cover the mold releasing film 42 from the top. A peripheral portion of the breather cloth 44 is fixed to the body portion 13 by a heat-resistant seal material (not shown). Note that, in a case where a vacuum bag 46 (described below) is formed in a pouch shape, the breather cloth 44 may be formed in a pouch shape so that the body portion 13 is inserted into the breather cloth 44. Alternatively, the breather cloth 44 may be formed in a large rectangular sheet shape so that the whole body portion 13 is wrapped in the breather cloth 44.

Subsequently, the vacuum big 46 is set in the bumper RF 12 (a third step). The vacuum bag 46 is a sheet material made of synthetic resin material having airtightness and heat resistance. Note that the vacuum bag 46 corresponds to "a covering member" in the disclosure.

Figure 6:
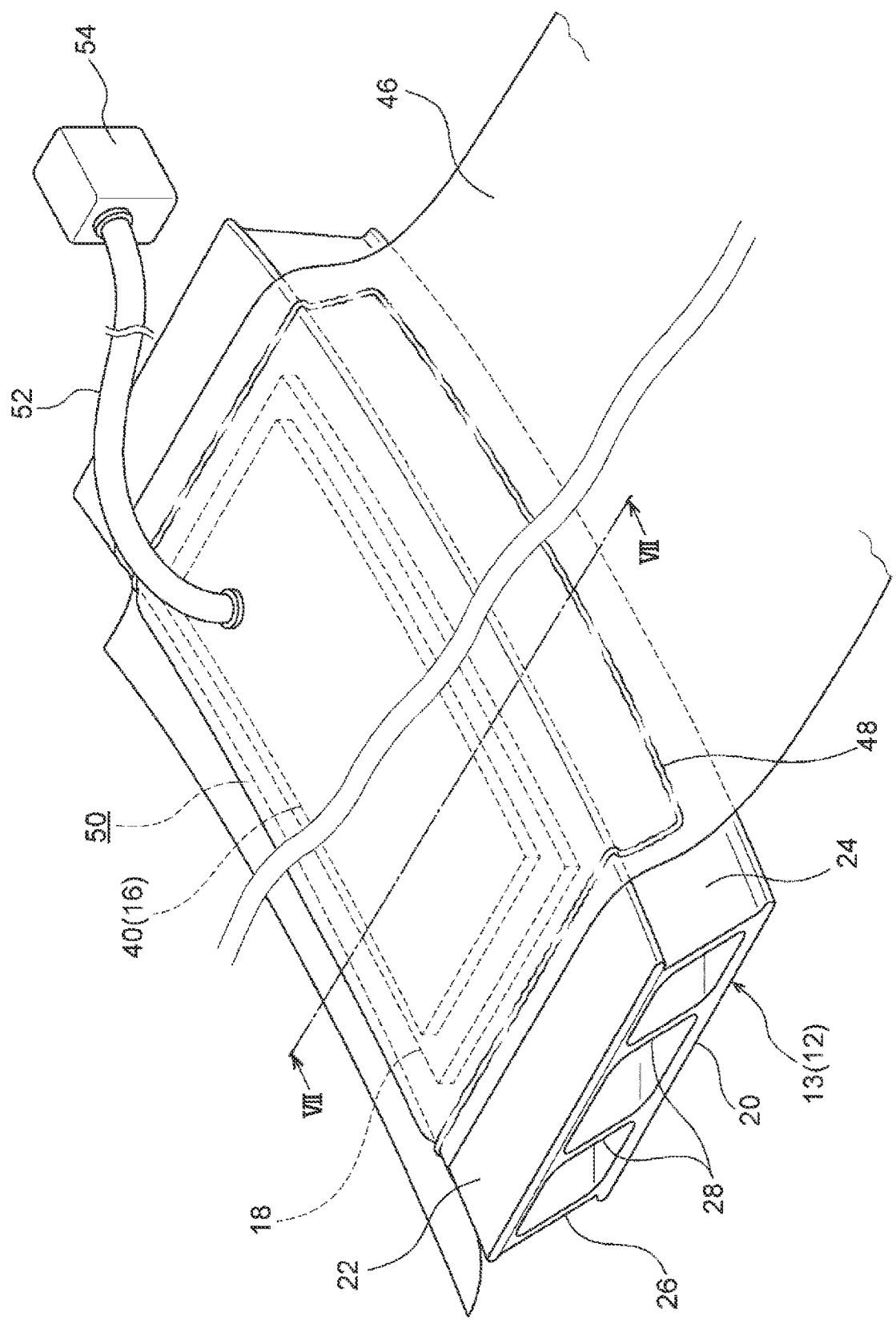
FIG. 6 is a schematic perspective view to describe a state where a breather cloth is thermally deposited on the bumper reinforcement illustrated in FIG. 5.
Figure 7:
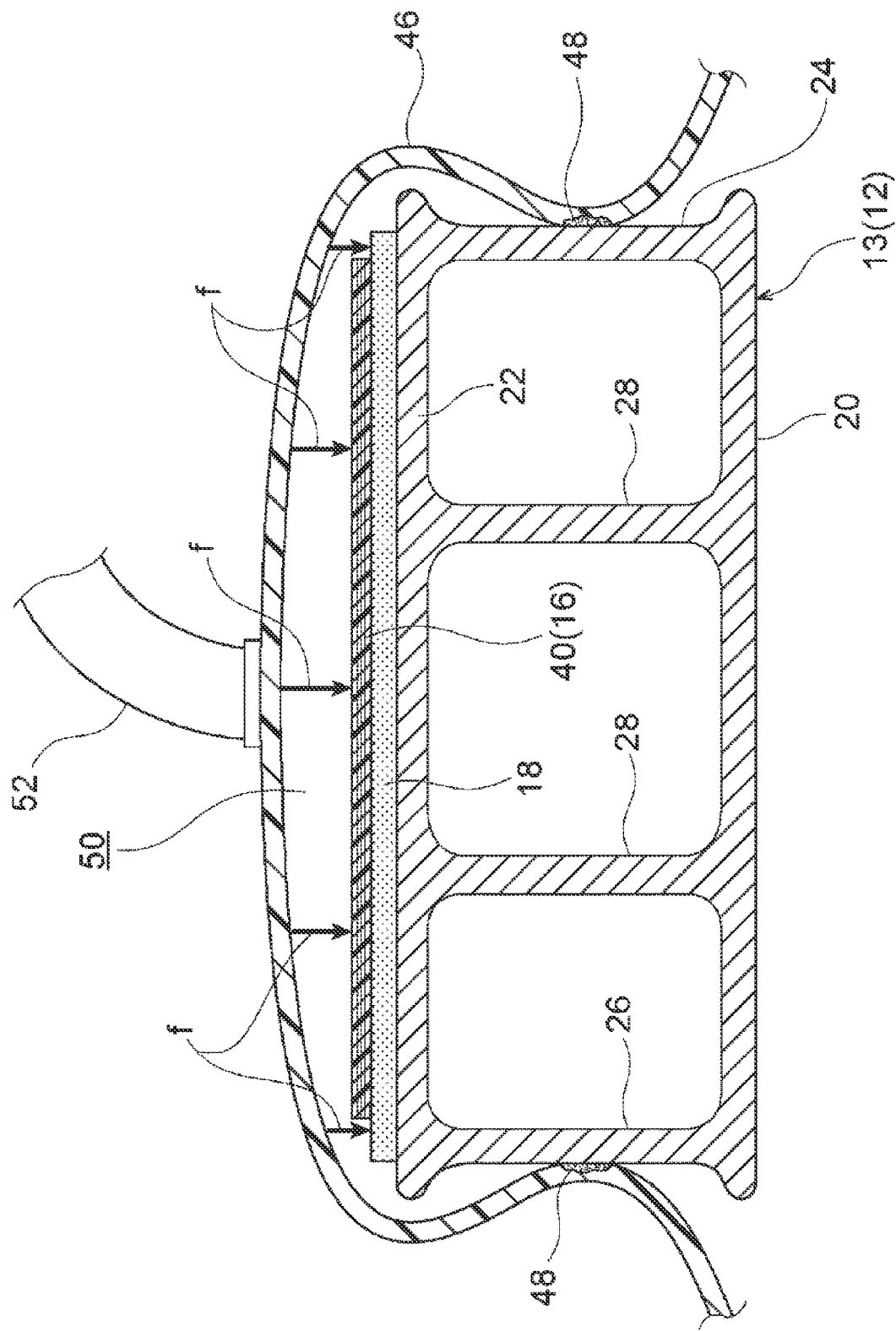
FIG. 7 is a schematic enlarged sectional view illustrating a state cut along a line VII-VII in FIG. 6.

As illustrated in FIGS. 6 and 7, the vacuum bag 46 of the present embodiment is formed into a rectangular sheet shape and put on the body portion 13 from the top so as to cover a whole outer surface (a front face in the vehicle front-rear direction) of the second vertical wall 22 of the body portion 13. Then, the vacuum bag 46 is fixed to the body portion 13 by a welding portion 48. The welding portion 48 is provided to surround the peripheral portion of the adhesive layer 18 covered with the breather cloth 44 by a heating device (not shown). Hereby, a sealed space 50 is provided as an internal space formed between the second vertical wall 22 of the body portion 13 and the vacuum bag 46. That is, the adhesive layer 18 and the laminated prepreg materials 40 are disposed inside the sealed space 50. Note that, in FIG. 7, the mold releasing film 42 and the breather cloth 44 are not illustrated for purposes of this description.

In some embodiments, although not illustrated herein, at the time of mass production of the bumper RF 12, a plurality of body portions 13 may be put on a predetermined working table and a rectangular sheet-shape vacuum bag 46 having a size to cover the body portions 13 be put on them from the top. In some embodiments, the sealed space 50 may be formed between each of the second vertical walls 22 of the body portions 13 and the vacuum bag 46 by the heat welding process.

A first end of a heat-resistant hose 52 communicating with the sealed space 50 is connected to the vacuum bag 46. A second end of the heat-resistant hose 52 is connected to a reducer 54 (a so-called vacuum pump), so that the reducer 54 reduces the pressure inside the sealed space 50 to perform air vent (vacuum drawing) inside the adhesive layer 18 and the laminated prepreg materials 40.

Here, when vacuum drawing of the sealed space 50 is performed, the sealed space 50 is gradually contracted so that the vacuum bag 46 deforms to stick to the bumper RF 12. On this account, the surfaces of the adhesive layer 18 and the prepreg materials 40 are evenly pressurized to be pressed by the vacuum bag 46 (see an arrow f in FIG. 7).

Then, the bumper RF 12 on which the vacuum bag 46 is put is placed in a high-temperature furnace (not shown) and heated (a fourth step). In the fourth step, the prepreg materials 40 are buried in the basic layer 18A of the adhesive layer 18 due to the pressing force of the vacuum bag 46. Further, the end layer 18B in the adhesive layer 18 is pressed to slightly extend outwardly in the surface direction and its surface shape deforms into a smooth curved surface. Hereby, a sectional shape of the end layer 18B in the thickness direction has a quadrant shape, so that the thickness of the end layer 18B is gradually reduced as it goes outwardly in the surface direction (that is, as the end layer 18B is distanced outwardly from surface ends of the prepreg materials 40). The quadrant shape may be a shape in which the surface of the end layer 18B has a curved surface projecting upward, other than a shape obtained by dividing a circle strictly into four.

After that, as the viscosity of the resin decreases, the adhesive layer 18 and the prepreg materials provided in a laminated manner thermally cure, so that the plate-shaped reinforcing member 16 made of carbon fiber reinforced resin is molded. That is, the body portion 13 of the bumper RF 12 functions as a jig for the prepreg materials, so that molding of the reinforcing member 16 made of fiber reinforced resin is completed by a well-known vacuum bagging technique. Further, when the adhesive layer 18 thermally cures, joining between the body portion 13 and the reinforcing member 16 is completed. Hereby, the bumper RF 12 is manufactured.

Operation and Effect of Present Embodiment

An operation and an effect of the present embodiment are described below.

The bumper RF 12 of the present embodiment includes the metal body portion 13 having the first vertical wall 20 and the second vertical wall 22 disposed to face each other. In the body portion 13, the sheet-shaped reinforcing member 16 made of fiber reinforced resin is joined, via the adhesive layer 18, to the second vertical wall 22 constituting the front face in the vehicle front-rear direction. Hereby, the bumper RF 12 is reinforced by the reinforcing member 16.

In the meantime, in a structure in which a metal material is joined to a fiber reinforced resin material via an adhesive like the bumper RF 12 according to the present embodiment, in a case where separation between the metal material and the fiber reinforced resin material occurs, this separation is often caused due to separation between the adhesive and the metal material. Particularly, in the bumper RF 12 of the present embodiment, at the time when an external force is applied due to a collision of the vehicle or the like, if a stress excessively concentrates on the surface end 16A of the reinforcing member 16, the adhesive joining the surface end might be peeled off from the bumper RF 12. On this account, the restraint of the stress concentration to a part of the adhesive layer 18, placed in the vicinity of the surface end 16A of the reinforcing member 16, leads to improvement in the joining strength between the bumper RF 12 and the reinforcing member 16.

Here, in the end layer 18B constituting the adhesive layer 18 (the part placed outwardly in the surface direction from the surface end 16A of the reinforcing member 16), the thickness in the vehicle front-rear direction becomes thinner as the end layer 18B is distanced outwardly from the surface end 16A. On this account, at the time when an external force (see an arrow F illustrated in FIG. 2) input into the bumper RF 12 due to a collision of the vehicle or the like is transmitted to the adhesive layer 18, a shear stress caused in the adhesive layer 18 is restrained from concentrating on the end layer 18B. As a result, the separation of a surface end of the adhesive layer 18 from the bumper RF 12 is restrained, thereby making it possible to improve the joining strength between the bumper RF 12 and the reinforcing member 16.

Further, in the present embodiment, since the reinforcing member 16 is buried in the adhesive layer 18, the end surface 16B of the reinforcing member 16 is covered with the adhesive layer 18. That is, the adhesive layer 18 has the joining surface U1 along the surface direction of the reinforcing member and the joining surface U2 along the thickness direction. Hereby, for example, in comparison with a case where the reinforcing member 16 is joined to the adhesive layer 18 only by the joining surface U1, a contact area between the reinforcing member 16 and the adhesive layer 18, that is, a joining area between the reinforcing member 16 and the adhesive layer 18 increases. As a result, the joining strength between the reinforcing member 16 and the adhesive layer 18 improves, so that the joining strength between the bumper RF 12 and the reinforcing member 16 eventually improves.

Further, in the present embodiment, the end layer 18B in the adhesive layer 18 is formed to have a quadrant shape in a sectional view along the vehicle front-rear direction. On this account, in the end layer 18B, while the thickness in the vehicle front-rear direction is gradually reduced as the end layer 18B is distanced outwardly from the surface end 16A, the thickness of the adhesive layer placed in the vicinity of the surface end of the reinforcing member 16 can be easily secured. On this account, in the end layer 18B, the thickness of the adhesive layer 18 is secured sufficiently in the vicinity of the surface end of the reinforcing member 16 so as to maintain the joining strength, and the plate thickness is reduced in a part outside the reinforcing member 16 in the surface direction so as to restrain stress concentration, thereby improving the joining strength. Accordingly, it is possible to effectively achieve improvement of the joining strength between the bumper RF 12 and the reinforcing member 16.

Further, the manufacturing method of the bumper RF 12 according to the present embodiment includes the first step and the second step of laminating the adhesive layer 18 and the prepreg materials 40 on the second vertical wall 22 of the metal body portion 13 in advance. Subsequently, in the third step, the second vertical wall 22 of the body portion 13 is covered with a covering member, and the sealed space 50 is subjected to vacuum drawing. After that, in the fourth step, the second vertical wall 22 of the body portion 13 is subjected to the heat treatment, so that respective heat curing processes of the reinforcing member 16 (the prepreg materials 40) and the adhesive layer 18 can be performed at the same time.

Here, in the third step, the vacuum bag 46 deforms to stick to the second vertical wall 22 of the body portion 13. Along with this, the prepreg materials 40 laminated on the second vertical wall of the body portion 13 and the adhesive layer 18 are pressed by the vacuum bag 46. As a result, the end layer 18B of the adhesive layer 18 deforms such that the thickness in the vehicle front-rear direction becomes thinner as the end layer 18B is distanced outwardly from the surface end 16A. Hereby, it is possible to manufacture the bumper RF 12 that can achieve improvement of the joining strength between the bumper RF 12 and the reinforcing member 16.

Further, in the manufacturing method, respective heat curing processes of the reinforcing member 16 (the prepreg materials 40) and the adhesive layer 18 can be performed at the same time. That is, a molding process of fiber reinforced resin by a so-called vacuum bagging method and a joining process of the reinforcing member 16 made of the fiber reinforced resin and the body portion 13 can be performed at the same time. This largely improves the productivity of the bumper RF 12.

The following supplementally describes the effect. Generally, in a case where fiber reinforced resin is molded by use of the vacuum bagging method, sheet-shaped fiber reinforced resin is laminated on a metal jig. Then, the jig and the fiber reinforced resin laminated on the jig are subjected to vacuum drawing and then to a heat treatment, so that the fiber reinforced resin thermally cures. Accordingly, in a step in the general vacuum bagging method, it is necessary to separately perform a step of molding fiber reinforced resin to form a reinforcing member and a step of joining the reinforcing member to a bumper reinforcement by an adhesive.

In contrast, in the present disclosure, the metal body portion 13 constituting the bumper RF 12 can serve as the jig. On this account, by joining the body portion 13 to the laminated prepreg materials 40 via the adhesive layer 18 in advance, the molding of the reinforcing member 16 and the joining process of joining the reinforcing member 16 to the body portion 13 can be performed at the same time. As a result, it is possible to reduce production steps of the bumper RF 12, thereby making it possible to improve the productivity.

Further, in the manufacturing method, it is possible to perform the molding of the reinforcing member 16 and the joining process of joining the body portion 13 to the reinforcing member 16 by fixing the sheet-shaped vacuum bag 46 to the bumper RF 12 and heating the vacuum bag 46 in the high-temperature furnace. On this account, in comparison with a case where the reinforcing member 16 is molded by pressing the prepreg materials 40 by use of an exclusive upper die and the body portion 13 as a lower die, for example, the bumper RF 12 can be manufactured without using a large facility such as a pressing machine. As a result, the bumper RF 12 can be manufactured while upsizing of a manufacturing facility is restrained. Further, since it is not necessary to fix the body portion 13 inside a mold, the bumper RF 12 can be manufactured while variations in the body portion 13 between products are absorbed, in comparison with press molding.

Further, in the present embodiment, the adhesive layer 18 is formed in a rectangular sheet shape that is one size larger than the outer shape of the reinforcing member 16, and the adhesive layer 18 is made of epoxy-based resin having an insulating property. On this account, it is possible to prevent galvanic corrosion between the metal body portion 13 and the reinforcing member 16 made of fiber reinforced resin.

Further, the adhesive layer 18 of the present embodiment is epoxy-based resin formed into a sheet shape. On this account, when the reinforcing member 16 is laminated on the adhesive layer 18 from the top, the plate thickness of the adhesive layer 18 can be kept uniform. Hereby, it is possible to restrain variations in the joining strength between the bumper RF 12 and the reinforcing member 16.

Further, in the present embodiment, the body portion 13 is made of aluminum alloy. On this account, in comparison with a case where the body portion 13 is made of steel or iron, it is possible to achieve light-weighting of the bumper RF 12.

Further, in the present embodiment, the thickness T1 of the first vertical wall 20 constituting the rear face of the bumper RF 12 in the vehicle front-rear direction is set to be thicker than the thickness T2 of the second vertical wall 22 constituting the front face of the bumper RF 12 in the vehicle front-rear direction. The reinforcing member 16 is joined to the front face of the bumper RF 12. Hereby, by reducing the plate thickness of the rear face of the bumper RF 12 in the vehicle front-rear direction and reinforcing the bumper RF 12 by the reinforcing member 16 made of fiber reinforced resin, it is possible to effectively secure rigidity of the bumper RF 12 and achieve light-weighting of the bumper RF 12.

Supplementary Description of Embodiment

In the above embodiment, since the reinforcing member 16 is buried in the adhesive layer 18, the surface end 16A of the reinforcing member 16 is covered with the adhesive layer 18. However, the disclosure is not limited to this. As illustrated in FIG. 8A, the reinforcing member 16 may not be buried in the adhesive layer 18. That is, the reinforcing member 16 may be joined to the adhesive layer 18 only by the joining surface U1 along the surface direction.

Further, in the above embodiment, the end layer 18B constituting the adhesive layer 18 is formed to have a quadrant sectional shape in a sectional view along the vehicle front-rear direction. However, the disclosure is not limited to this. As illustrated in FIG. 8B, the reinforcing member 16 may be buried in on adhesive layer 60 similarly to the above embodiment, and an end layer 60B of the adhesive layer 60 may be formed to have a triangular sectional shape in a sectional view along the vehicle front-rear direction. Alternatively, as illustrated in FIG. 8C, the reinforcing member 16 may not be buried in the adhesive layer 60, and the end layer 60B of the adhesive layer 60 may be formed to have a triangular sectional shape in a sectional view along the vehicle front-rear direction.

Alternatively, as illustrated in FIG. 8D, the reinforcing member 16 may be buried in an adhesive layer 70 similarly to the above embodiment, and an outer surface of an end layer 70B of the adhesive layer 70 may be formed into a circular arc shape projecting rearward (toward the body portion 13 side) in the vehicle front-rear direction. Alternatively, as illustrated in FIG. 8E, the reinforcing member 16 may not be buried in the adhesive layer 70, and the outer surface of the end layer 70B of the adhesive layer 70 may be formed into a circular arc shape projecting rearward (toward the body portion 13 side) in the vehicle front-rear direction.

Further, in the present embodiment, the dimension of the adhesive layer 18 in the vehicle width direction is set to be larger than the dimension of the reinforcing member 16 in the vehicle width direction and the dimension of the reinforcing member 16 in the vehicle up-down direction, and the dimension of the adhesive layer 18 in the vehicle up-down direction is set to be larger than the dimension of the reinforcing member 16 in the vehicle up-down direction. However, the disclosure is not limited to this. For example, an adhesive layer configured such that a dimension in the vehicle width direction is set to be larger than the dimension of the reinforcing member 16 in the vehicle width direction and a dimension in the vehicle up-down direction is set to be the same as or smaller than the dimension of the reinforcing member 16 in the vehicle up-down direction may be used. Alternatively, an adhesive layer configured such that a dimension in the vehicle up-down direction is set to be larger than the dimension of the reinforcing member 16 in the vehicle up-down direction and a dimension in the vehicle width direction is set to be the same as or smaller than the dimension of the reinforcing member 16 in the vehicle width direction may be used.

Further, in the present embodiment, the fiber direction of the fiber permeated in the reinforcing member 16 is along the longitudinal direction of the bumper RF 12 (the vehicle width direction). However, the disclosure is not limited to this. For example, a reinforcing member in which the fiber direction has an angle inclined to the vehicle width direction may be used. Alternatively, in a step of molding the reinforcing member 16, the reinforcing member 16 may be formed in such a manner that respective fiber directions of prepreg materials to be laminated are set to different directions that intersect with each other, and they are laminated to each other.

Further, in the manufacturing method of the bumper 10 according to the present embodiment, the vacuum bag 46 has a rectangular sheet shape, and the rear face of the bumper RF 12 in the vehicle front-rear direction is covered with the vacuum bag 46 from the top. However, the disclosure is not limited to this. A vacuum bag formed in a pouch shape may be used. In this case, the whole bumper RF 12 is inserted into the vacuum bag, and the vacuum bag is subjected to vacuum drawing. Hereby, an internal space formed between the rear face of the bumper RF 12 in the vehicle front-rear direction and the vacuum bag can be subjected to vacuum drawing.

Further, the reinforcing member 16 of the above embodiment is molded by thermally curing the laminated prepreg materials 40 by use of the vacuum bagging method. However, the disclosure is not limited to this. For example, the bumper RF 12 may be molded in such a manner that the adhesive layer 18 and the prepreg materials 40 are laminated on the body portion 13, and the body portion 13 is set inside a well-known autoclave device and is heated under a high pressure.

Further, in the above embodiment, the bumper RF 12 is disposed in the rear end of the vehicle. However, the disclosure is not limited to this. The bumper RF 12 may be disposed in the front end of the vehicle.

Second Embodiment

Next will be described a door impact beam 80 as a vehicle constituent member according to a second embodiment with reference to FIGS. 9 and 10. Note that the same constituent as in the first embodiment has the same reference sign as in the first embodiment, and the description thereof is omitted. The door impact beam 80 according to the second embodiment is configured such that the reinforcing member 16 is joined to a body portion 82 made of metal such as aluminum alloy via the adhesive layer 18.

The body portion 82 includes a first vertical wall 84 extending with its longitudinal direction being along the vehicle front-rear direction and curved to project outward in the vehicle width direction in a front view or a rear view of the vehicle, and a second vertical wall 86 provided inwardly in the vehicle width direction from the first vertical wall 84 to extend in the front-rear direction. Further, the first vertical wall 84 and the second vertical wall 86 are connected to each other via a plurality of (four, in the present embodiment) lateral walls 87 extending along the vehicle width direction. Hereby, the body portion 82 is formed to have a generally ladder-shaped section when the body portion 82 is viewed from the longitudinal direction of the door impact beam 80. Note that the first vertical wall 84 and the second vertical wall 86 correspond to "a pair of vertical walls" in the disclosure.

Figure 10:
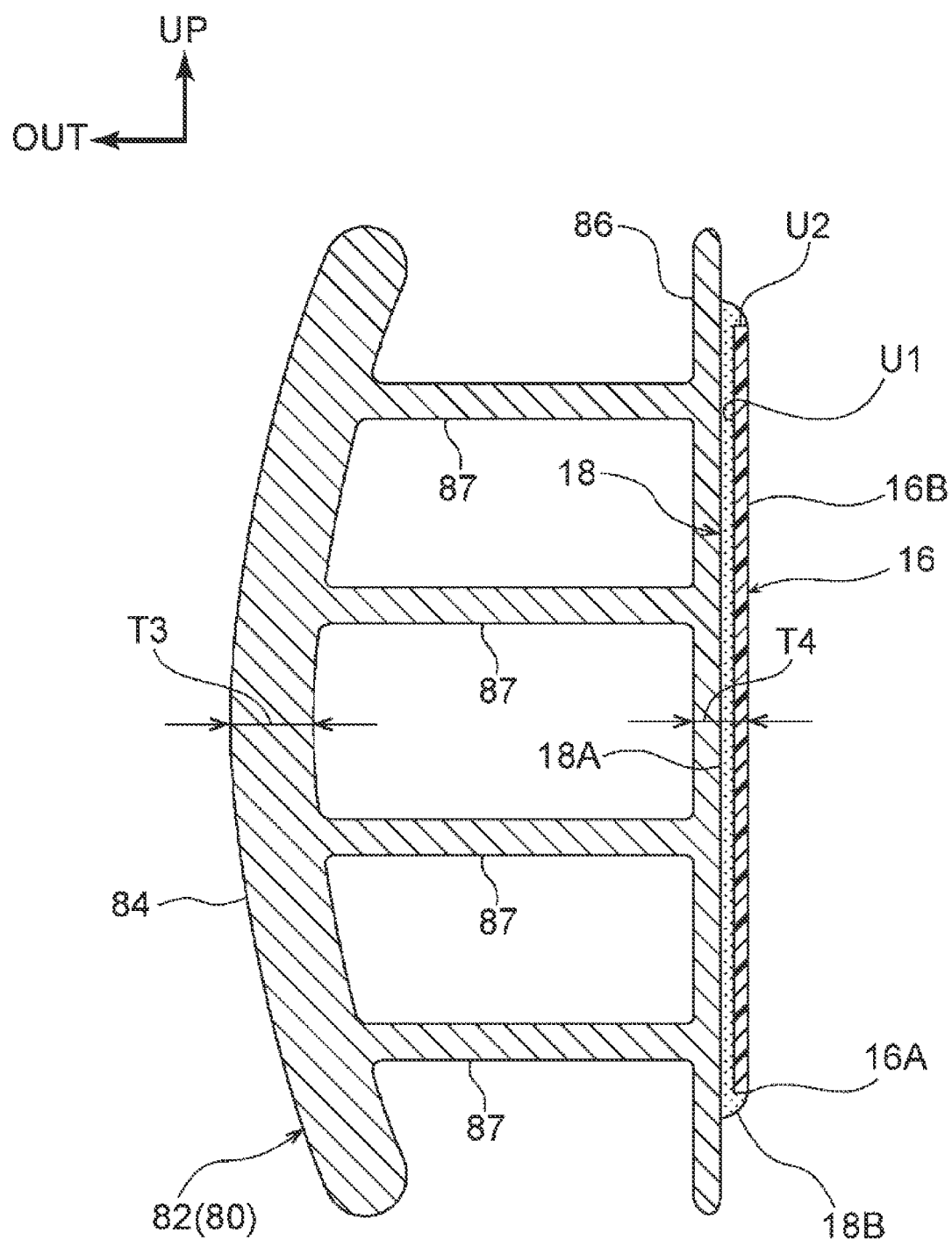
FIG. 10 is an enlarged sectional view illustrating a section of the door beam cut along a line X-X in FIG. 9 in an enlarged manner.

Further, as illustrated in FIG. 10, a thickness T3 of the first vertical wall 84 is set to be thicker than a thickness T4 of the second vertical wall 86.

Figure 9:
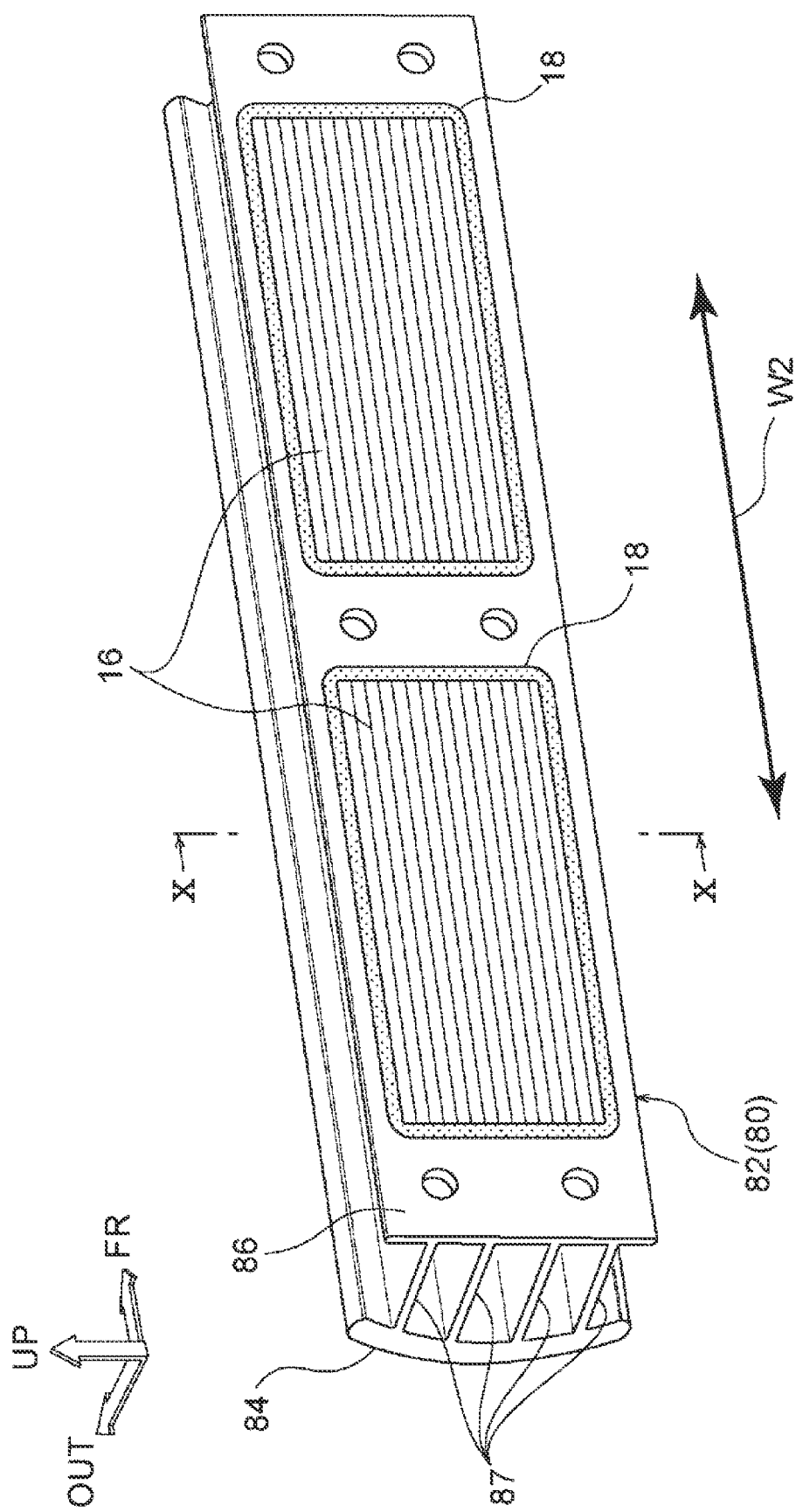
FIG. 9 is a perspective view illustrating a door beam according to a second embodiment.

As illustrated in FIGS. 9 and 10, sheet-shaped reinforcing members 16 are joined to the light and left sides of the second vertical wall 86 of the body portion 82 via respective adhesive layers 18, when the second vertical wall 86 is viewed from the vehicle width direction. Since the reinforcing member 16 and the adhesive layer 18 have the same configurations as those in the first embodiment, the descriptions thereof are omitted. Note that, in the present embodiment, the fiber direction of the reinforcing member 16 agrees with the vehicle front-rear direction (see an arrow-W2 direction in FIG. 9).

In the door impact beam 80, the body portion 82 of the door impact beam 80 can be used as a jig at the time of manufacture, similarly to the first embodiment. On this account, molding of the reinforcing member 16 and a joining process of joining the reinforcing member 16 to the door impact beam 80 can be performed at the same time by use of a well-known vacuum bagging method.

Operations/Effects

The present embodiment basically follows the configuration described in the first embodiment, so that operations and effects similar to those in the first embodiment can be obtained.

Third Embodiment

Next will be described a B-pillar 90 as a vehicle constituent member according to a third embodiment with reference to FIGS. 11 and 12. Note that the same constituent as in the first embodiment has the same reference sign as in the first embodiment, and the description thereof is omitted. The B-pillar 90 according to the third embodiment is configured such that the reinforcing member 16 is joined to a body portion 92 made of metal such as aluminum alloy via the adhesive layer 18.

The B-pillars 90 are disposed on the opposite sides, in the vehicle width direction, of a roof panel (not shown) of the vehicle such that the B-pillars 90 extend downward from respective intermediate parts, in the longitudinal direction, of right and left roof side rails (not shown) provided in a pair and extending in the vehicle front-rear direction. Note that a pair of right and left A-pillars (not shown) is provided such that the A-pillars extend downward from respective front ends of the roof side rails, and a pair of right and left C-pillars (not shown) is provided such that the C-pillars extend downward from respective rear ends of the roof side rails.

Figure 12:
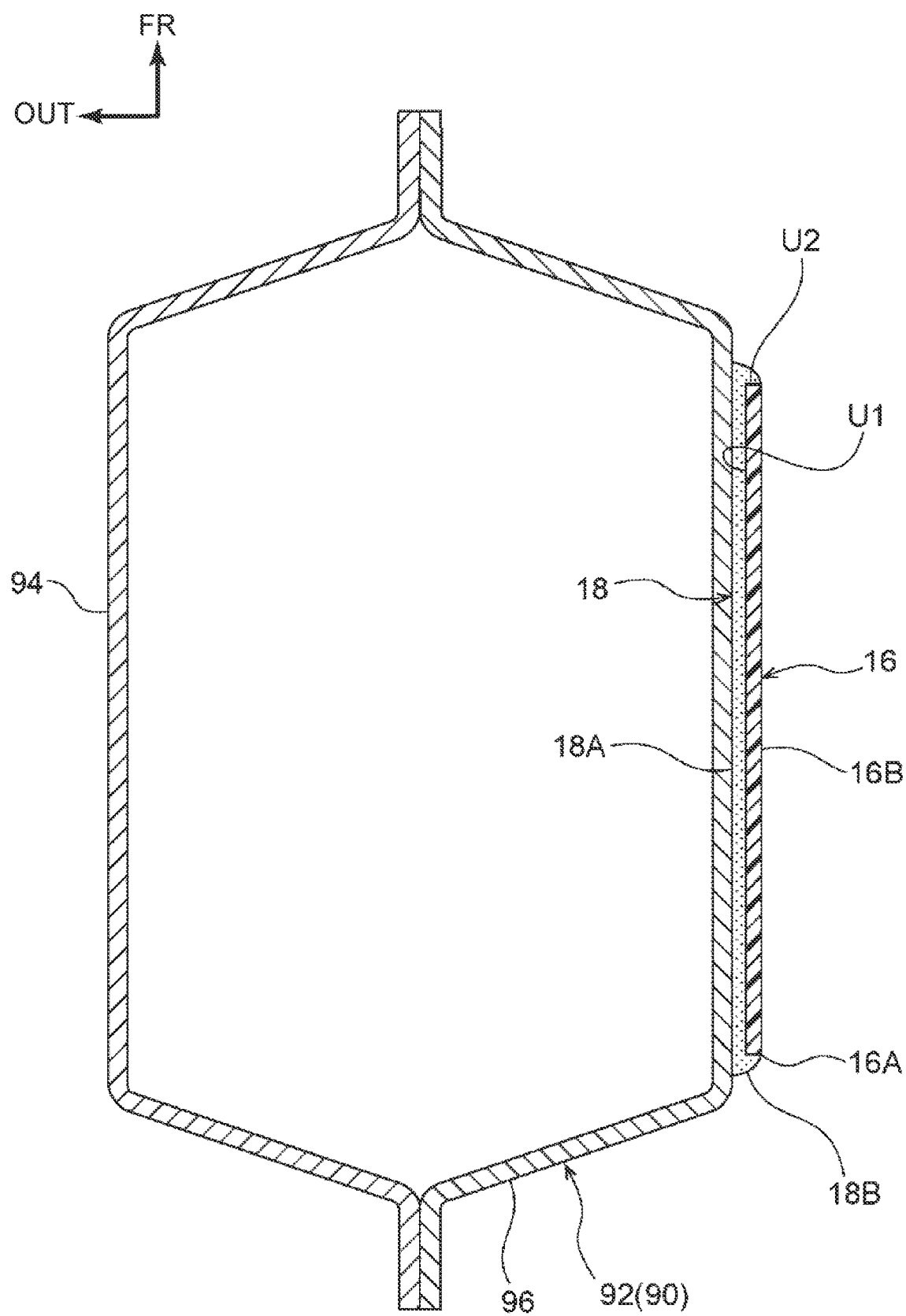
FIG. 12 is an enlarged sectional view illustrating a section of the pillar portion cut along a line XII-XII in FIG. 11 in an enlarged manner.

As illustrated in FIG. 12, a body portion 92 of the B-pillar 90 is formed in a hollow columnar shape, and the body portion 92 includes an outer pillar 94 disposed on the outer side in the vehicle width direction and an inner pillar 96 disposed on the inner side in the vehicle width direction. The outer pillar 94 is configured such that a section vertical to its extending direction is opened inwardly in the vehicle width direction so as to have a hat shape projecting outwardly in the vehicle width direction, and the inner pillar 96 is configured such that a section vertical to its extending direction is opened outwardly in the vehicle width direction so as to have a hat shape projecting inwardly in the vehicle width direction. The opposite ends of the outer pillar 94 in the vehicle front-rear direction are joined to the opposite ends of the inner pillar 96 in the vehicle front-rear direction, so that a closed section is formed. Note that the outer pillar 94 and the inner pillar 96 correspond to "a pair of vertical walls" in the disclosure.

Figure 11:
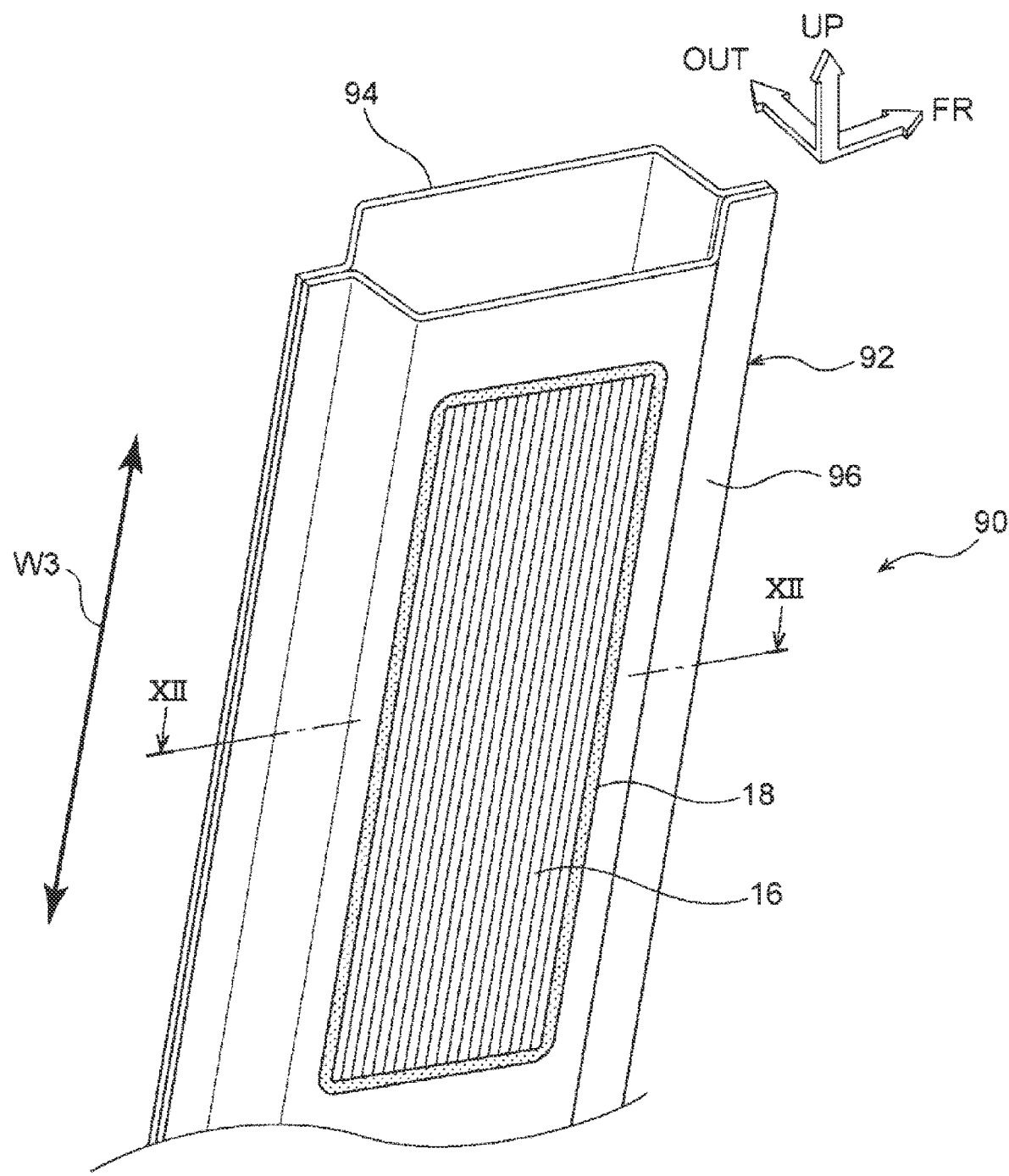
FIG. 11 is a perspective view illustrating a pillar portion of a third embodiment.

As illustrated in FIGS. 11 and 12, the sheet-shaped reinforcing member 16 is joined to an inner face, in the vehicle width direction, of the inner pillar 96 via the adhesive layer 18. In the present embodiment, the reinforcing member 16 is formed in a generally rectangular shape with its longitudinal direction being along the vehicle up-down direction when the reinforcing member 16 is viewed from the vehicle width direction. The inner pillar 96 is joined to the reinforcing member 16 by the adhesive layer 18 that is one size larger than the outside diameter of the reinforcing member 15. Further, the fiber direction of the reinforcing member 16 agrees with the vehicle up-down direction (see an arrow-W3 direction in FIG. 11). Note that, since other configurations of the reinforcing member 16 and the adhesive layer 18 are similar to those in the first embodiment, the descriptions thereof are omitted.

In the B-pillar 90, the body portion 92 of the B-pillar 90 can be used as a jig at the time of manufacture, similarly to the first embodiment. On this account, molding of the reinforcing member 16 and a joining process of joining the reinforcing member 16 to the B-pillar 90 can be performed at the same time by use of a well-known vacuum bagging method.

Note that, in the present embodiment, the reinforcing member 16 is configured to be joined to the B-pillar 90 of the vehicle. However, the disclosure is not limited to this, and the reinforcing member 16 may be joined to the A-pillar or the C-Pillar.

What is claimed is:

1. A vehicle constituent member comprising:
a body portion made of metal and having a pair of pillars, the pair of pillars including an outer pillar disposed on an outer side in a vehicle width direction and an opposite inner pillar disposed on an inner side in the vehicle width direction, the outer pillar having an outer vertical section projecting outwardly in the vehicle width direction and, the inner pillar having an inner vertical section projecting inwardly in the vehicle width direction, the inner vertical section having a first surface opposite a second surface, the first surface inward in the vehicle width direction to the second surface, the outer pillar and inner pillar having opposite ends joined as to form a hollow columnar shape;
a reinforcing member made of fiber reinforced resin and having a sheet shape, the sheet shape comprising a first end surface, a second end surface opposite the first end surface, the first end surface between the second end surface and the first surface of the inner pillar, and four peripheral edges surrounding a perimeter of the reinforcing member, one peripheral edge of the four peripheral edges is a surface end, the reinforcing member being disposed on the first surface of the inner pillar; and
an adhesive layer provided between the first surface of the inner pillar and the reinforcing member and joining the inner pillar to the reinforcing member, the adhesive layer being configured such that a thickness, in a vehicle front-rear direction, of a part of the adhesive layer becomes thinner as the part of the adhesive layer is distanced outwardly from the surface end of the reinforcing member, the part of the adhesive layer being disposed outwardly from the surface end of the reinforcing member, the thickness of the part of the adhesive layer distanced outwardly from the surface end of the reinforcing member is equal to or less than a maximum plate thickness, the maximum plate thickness being a distance between the first surface of the inner pillar and the second end surface of the reinforcing member with the adhesive layer in between, a thickness of a part of the adhesive layer distanced between the first surface of the inner pillar and the first end surface of the reinforcing member is greater than a reinforcing member thickness, the reinforcing member thickness being a distance between the first end surface and the second end surface of the reinforcing member,
wherein the first end surface of the reinforcing member is covered with the adhesive layer,
the reinforcing member and the adhesive layer have a first joining surface along a surface direction of the reinforcing member, a second joining surface along a thickness direction of the reinforcing member, and
all the peripheral edges of the reinforcing member are covered with the adhesive layer.

2. The vehicle constituent member according to claim 1, wherein
a first portion of the adhesive layer, the first portion being disposed outwardly from the surface end of the reinforcing member, has a quadrant shape in a sectional view of the body portion along the vehicle front-rear direction.

3. The vehicle constituent member according to claim 1, wherein
no step is formed in a boundary portion between the surface end of the reinforcing member and the adhesive layer.

4. A vehicle constituent member comprising:
a body portion made of metal and having a pillar configured such that a vertical section projects outwardly, the vertical section set between opposite ends of the pillar, the vertical section having a first surface opposite a second surface;
a reinforcing member made of fiber reinforced resin and having a sheet shape, the sheet shape comprising a first end surface, a second end surface opposite the first end surface, the first end surface between the second end surface and the pillar, and four peripheral edges surrounding a perimeter of the reinforcing member, one peripheral edge of the four peripheral edges is a surface end, the reinforcing member being disposed on the first surface of the pillar and positioned entirely on the vertical section; and
an adhesive layer provided between the surface of the pillar and the reinforcing member and connecting the pillar and the reinforcing member, the adhesive layer being configured such that a thickness of a part of the adhesive layer becomes thinner as the part of the adhesive layer is distanced outwardly from the surface end of the reinforcing member in a planar view of the reinforcing member, the part of the adhesive layer being disposed outwardly from the surface end of the reinforcing member, the thickness of the part of the adhesive layer distanced outwardly from the surface end of the reinforcing member is equal to or less than a maximum plate thickness, the maximum plate thickness being a distance between the first surface of the pillar and the second end surface of the reinforcing member with the adhesive layer in between, a thickness of the part of a adhesive layer distanced between the first surface of the pillar and the first end surface of the reinforcing member is greater than a reinforcing member thickness, the reinforcing member thickness being a distance between the first end surface and the second end surface of the reinforcing member,
wherein the first end surface of the reinforcing member is covered with the adhesive layer,
the reinforcing member and the adhesive layer have a first joining surface along a surface direction of the reinforcing member, a second joining surface along a thickness direction of the reinforcing member, and
all the peripheral edges of the reinforcing member are covered with the adhesive layer.

5. The vehicle constituent member according to claim 4, wherein
no step is formed in a boundary portion between the surface end of the reinforcing member and the adhesive layer.

6. A vehicle constituent member comprising:
a body portion made of metal and having a pair of pillars, the pair of pillars including an outer pillar disposed on an outer side in a vehicle width direction and an opposite inner pillar disposed on an inner side in the vehicle width direction, the outer pillar having an outer vertical section projecting outwardly in the vehicle width direction and, the inner pillar having an inner vertical section projecting inwardly in the vehicle width direction, the inner vertical section having a first surface opposite a second surface, the first surface inward in the vehicle width direction to the second surface, the outer pillar and inner pillar having opposite ends joined as to form a hollow columnar shape;
a reinforcing member made of fiber reinforced resin and having a sheet shape, the sheet shape comprising a first end surface, a second end surface opposite the first end surface, the first end surface between the second end surface and the first surface of the inner pillar, and four peripheral edges surrounding a perimeter of the reinforcing member, one peripheral edge of the four peripheral edges is a surface end, the reinforcing member being disposed on the first surface of the inner pillar; and
an adhesive layer provided between the first surface of the inner pillar and the reinforcing member and joining the inner pillar to the reinforcing member, the adhesive layer being configured such that a thickness, in a vehicle front-rear direction, of a part of the adhesive layer becomes thinner as the part of the adhesive layer is distanced outwardly from the surface end of the reinforcing member, the part of the adhesive layer being disposed outwardly from the surface end of the reinforcing member, the thickness of the part of the adhesive layer distanced outwardly from the surface end of the reinforcing member is equal to or less than a maximum plate thickness, the maximum plate thickness being a distance between the first surface of the inner pillar and the second end surface of the reinforcing member with the adhesive layer in between, a thickness of a part of the adhesive layer distanced between the first surface of the inner pillar and the first end surface of the reinforcing member is greater than a reinforcing member thickness, the reinforcing member thickness being a distance between the first end surface and the second end surface of the reinforcing member, and
the adhesive layer includes a first portion that is disposed outwardly from the surface end of the reinforcing member, the first portion has a quadrant shape in a sectional view of the body portion along the vehicle front-rear direction,
wherein the first end surface of the reinforcing member is covered with the adhesive layer,
the reinforcing member and the adhesive layer have a first joining surface along a surface direction of the reinforcing member, a second joining surface along a thickness direction of the reinforcing member, and
all the peripheral edges of the reinforcing member are covered with the adhesive layer.

* * * * *